Patented Apr. 23, 1929.

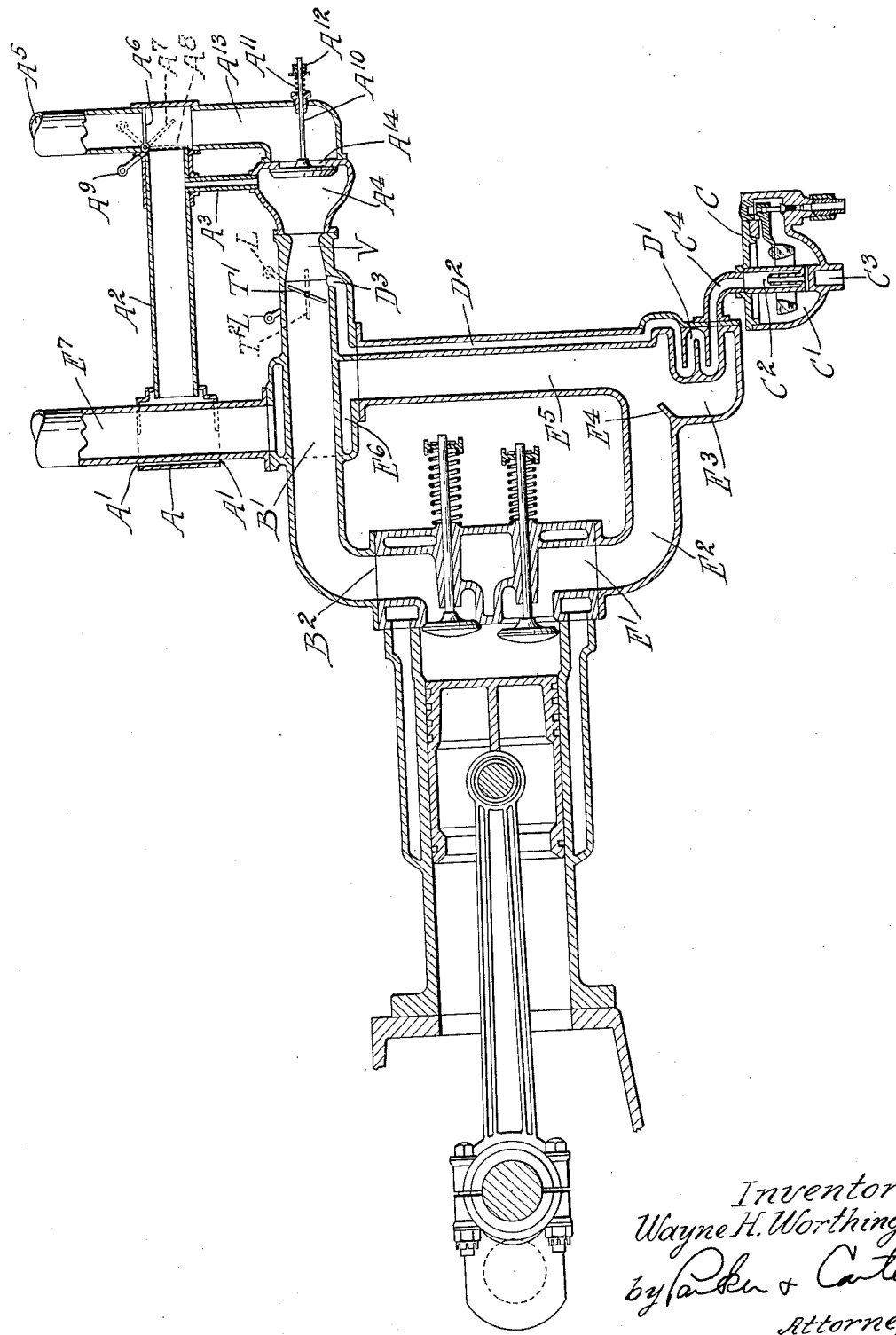

1,710,251

UNITED STATES PATENT OFFICE.

WAYNE H. WORTHINGTON, OF BATTLE CREEK, MICHIGAN.

METHOD OF PREPARING COMBUSTIBLE MIXTURES FOR INTERNAL-COMBUSTION ENGINES.

Application filed April 15, 1925. Serial No. 23,398.

This invention relates to an improvement in a process for preparing combustible mixtures for burning in internal combustion engines. It has for one object to provide a new and improved type of induction passage and a new and improved method or process of fuel treatment whereby a uniform, accurate and controlled mixing and heating treatment of the combustible fuel mixture may be obtained. It has for another object to provide a method and apparatus whereby heated mixing and induction passages may be used without cracking, polymerization, or other breaking down of the fuel. Another object is to provide an apparatus and process whereby the heating and mixing may be carried out without excessive overheating of the mixture under conditions of load, reduction of volumetric efficiency, power losses, and the like. A further object of my invention is to provide a means whereby the temperature of the mixture supplied to the engine will tend to rise as the rate of mixture consumption by the engine is decreased, and inversely, tend to become cooler as the rate of mixture consumption is increased. A still further object of my invention is to provide a simple means whereby the final temperature of the mixture as delivered to the engine may be controlled by the operator to compensate for varying temperature and climatic conditions as required.

The apparatus for carrying out the process is illustrated diagrammatically in the accompanying figure which is a cross section through my mixing device and through one cylinder of an internal combustion engine to which it is applied. The engine cylinder, piston and valves will not be described in detail as they are of well known types and their details form no part of my present invention.

The apparatus shown includes generally two parts, (1) that for making a primary air and fuel mixture and heating this mixture; (2) that for heating a secondary air supply, varying the temperature and the amount of this supply and mixing it with the primary air and re-heating the resultant final mixture.

C is a carburetor of any conventional type. It has a fuel chamber $C^1$, a jet $C^2$, an air inlet $C^3$ and a mixing chamber $C^4$.

$D^1$ is a primary mixture induction passage so shaped as to set up turbulence within the moving fuel mixture column. It is surrounded on one side by a surge pocket $E^3$ which is in communication with the exhaust pipe $E^2$ leading from the exhaust port $E^1$ and is provided with a baffle $E^4$ which deflects away from the surge pocket the direct heat of the exhaust gases. $D^2$ is a continuation of the induction passage $D^1$ and it lies generally within the exhaust passage $D^5$ and is heated by it and thereby heats the primary mixture moving along it.

I shall now describe the apparatus for and the method of heating what may be called a secondary air supply which is to be mixed with the primary air and fuel mixture. A is a stove mounted about the exhaust pipe $E^7$. It is provided with ports $A^1$ $A^1$ through which air enters, passes about the pipe $E^7$ and is drawn into the heated air duct $A^2$. $A^3$ is a heated air passage or idling tube through which heated air may be drawn at all times into the air chamber $A^4$.

$A^5$ is the normal cold air inlet. $A^6$ is a valve adapted to be operated by a lever $A^9$ and thereby to control the passage of cold air from the inlet $A^5$ into the air duct $A^{13}$. The valve is shown as at $A^6$ in full lines in the closed position. It is indicated at $A^7$, in dotted lines, as partially open and at $A^8$, in dotted lines, as closing the passage $A^2$. By the movement of the valve $A^6$ the proportion of cold air reaching the passage $A^{13}$ from the inlet $A^5$ and of the heated air from the stove A may be varied as desired.

$A^{10}$ is an auxiliary air valve yieldingly held to its seat by a spring $A^{11}$. Tension adjusting nuts $A^{12}$ are provided.

V is a venturi located on the engine side of the air chamber $A^4$. At its point of greatest vacuum the opening $D^3$ is provided, at which point the heated mixture of primary air and fuel strikes the air stream so as to set up a condition of turbulence within the entire mass of the combined air and fuel columns.

$T^1$ is a throttle valve provided with a control lever upon it and adapted for use in controlling the quantity of mixture drawn into the engine.

$B^1$ is an induction passage heated by the exhaust gases in the jacket $E^6$ which surrounds it. $B^2$ is the intake port of the engine through which the gases finally pass into the engine after they leave the induction passage $B^1$.

The use and operation of the invention are as follows:

The displacement of the piston with the engine cylinder during the intake stroke creates a partial vacuum in the induction passage on the intake side and induces a flow of air in the venturi and also a flow of air through the carburetor to the mixing orifice adjacent the venturi through which they are introduced to the main moving column.

The suction within the engine induces a flow of air through the carburetor intake past the fuel nozzle of the carburetor where a mixture of fuel and air is formed and from this point carried into the mixing chamber of the carburetor. This mixture passes into the heated, tortuous induction passage in which a violent turbulence is set up while the mixture column is being heated. The heating is progressive since the mixture is subjected to the more intense heat as it moves upward toward its point of discharge adjacent the venturi into the main moving column. This results in the gradual boiling off of the fuel fractions, those having a low boiling point being first absorbed into the mixture stream, being followed by those of successively higher boiling points, until a dry homogeneous gas is formed. As this superheated mixture comes into contact with the auxiliary air entering through the venturi, the difference in direction of the two columns together with the action of the venturi upon the air column sets up a degree of turbulence resulting in a homogeneous mixture of the entire resulting volume.

The auxiliary or secondary air is drawn partially through the stove and partially through the normal cold air intake. The upper valve may be manually adjusted to vary the proportion of cold air and hot air. Some heated air will always pass into the air chamber $A^4$ through the idling tube.

As the engine requirements vary due to a partially closed throttle or to a reduced engine speed or both, the degree of vacuum within the air chamber $A^4$ varies correspondingly so that the auxiliary air valve is held from its seat by the suction or drawn down upon its seat by the tension of the spring in response to this variation of suction from the engine. Thus, when for any reason the auxiliary air valve is closed, the entire volume of auxiliary or secondary air is heated, regardless of the position of the cold air control valve, since it is drawn through the idling tube from the stove.

As the engine requirements increase, the increasing suction opens the auxiliary air valve and admits more heated or unheated air, depending on the condition of the control valve $A^6$. While the temperature of the auxiliary air entering through the auxiliary air port $A^{14}$ is subject to the control of the operator, that entering through the idling tube $A^3$ is always, to some degree, heated, once there is any heat available from the exhaust for such heating. In this way, the use of heated auxiliary air is assured under conditions of reduced volumetric requirements, although as the engine requirements increase, unheated air may be supplied at the desire of the operator, according to the position of the valve $A^6$, whereby a degree of heat sufficient to maintain the fuel in gaseous form within the mixture stream is assured, under idling and low load conditions.

As the primary mixture is introduced into the secondary air mixture, the resulting mixture has a temperature lower than that of the primary and higher than that of the auxiliary or secondary mixture, and as this temperature falls below the dew point of the fuel, condensation occurs and a fog mixture is formed, so that after this junction, the resultant column is composed of a mixture of air, gaseous fuel, and liquid fuel entrained as a fog within the column. Passing the throttle T, expansion in a varying degree dependent upon the extent of the throttle opening occurs, accompanied by a reduction in temperature due to such expansion. At this point, however, heat is again applied through the medium of the exhaust jacket, gradually raising the temperature until the desired degree of dryness is obtained.

The application of heat to both the primary and secondary mixture passages as well as to the intake air, makes possible the preparation of a homogeneous mixture of any desired degree of dryness without subjecting the primary induction passage to a degree of heat sufficient to cause either automatic ignition or disassociation and polymerization of the fuel molecules, either before or after vaporization. Heretofore in apparatus of this nature, it has been necessary to limit the amount of air mixed with the fuel by the carburetor so that the resulting mixture was not capable of supporting combustion. This increase in the proportion of fuel to air necessitates a higher temperature to assure complete vaporization of the fuel, and as a result when the heat available for vaporization is low as when the volumetric requirements are small, as under low load conditions, erratic operating conditions obtain. On the other hand, with my system, the mixture prepared and delivered by the carburetor may be sufficiently lean to be combustible and the need for excessive temperatures of the primary mixture is obviated. Under low loads conditions as well as idling, the temperature of the exhaust gases is so low as to preclude the possibility of fuel crackling, while under load conditions, the volume of primary fuel and air mixture is so great in respect to the heating surface and the application of heat is so gradual that temperatures necessary to produce disassociation likewise cannot occur, either before or after vaporization. The advantages of this method lie in its ability to make and deliver to the engine a dry, homogeneous, gaseous mixture of fuel and air under all conditions of load, speed and volumetric requirements.

I claim:

The process of preparing a combustible mixture for internal combustion engines which comprise mixing a liquid fuel with air in such proportion that it will not sustain combustion, heating the resultant mixture to such a temperature as will produce a dry gaseous mixture, mixing the dry gaseous mixture with an additional supply of air to a temperature sufficiently low to cause condensation and then heating the resultant fog-like mixture to a point which will insure sufficient dryness to support satisfactory combustion.

Signed at Battle Creek, county of Calhoun and State of Michigan, this second day of April, 1925.

WAYNE H. WORTHINGTON.